(12) United States Patent
Korger

(10) Patent No.: US 7,032,104 B1
(45) Date of Patent: Apr. 18, 2006

(54) CONFIGURABLE HARDWARE REGISTER STACK FOR CPU ARCHITECTURES

(75) Inventor: Peter Korger, Frederick, CO (US)

(73) Assignee: LSI Logic Corporation, Milpitas, CA (US)

( * ) Notice: Subject to any disclaimer, the term of this patent is extended or adjusted under 35 U.S.C. 154(b) by 753 days.

(21) Appl. No.: 09/738,485

(22) Filed: Dec. 15, 2000

(51) Int. Cl.
*G06F 9/40* (2006.01)

(52) U.S. Cl. ...................................... 712/228

(58) Field of Classification Search ................ 712/228, 712/202, 242, 4, 5
See application file for complete search history.

(56) References Cited

U.S. PATENT DOCUMENTS

| | | | | |
|---|---|---|---|---|
| 4,402,042 A | * | 8/1983 | Guttag | 712/207 |
| 5,001,626 A | * | 3/1991 | Kashiyama et al. | 712/4 |
| 5,083,263 A | * | 1/1992 | Joy et al. | 712/41 |
| 5,226,142 A | * | 7/1993 | Vegesna et al. | 365/230.02 |
| 5,437,043 A | * | 7/1995 | Fujii et al. | 712/1 |
| 5,636,362 A | * | 6/1997 | Stone et al. | 711/129 |
| 5,655,132 A | * | 8/1997 | Watson | 718/104 |

* cited by examiner

*Primary Examiner*—Eddie Chan
*Assistant Examiner*—David J. Huisman
(74) *Attorney, Agent, or Firm*—Christopher P. Maiorana, P.C.

(57) ABSTRACT

A circuit comprising a register stack and a control circuit. The register stack may be configured as (i) a plurality of segments addressable through a segment address signal and (ii) a plurality of registers within each of the plurality of segments. The plurality of registers are generally addressable through a register address signal. The control circuit may be configured to (i) store a plurality of register states, (ii) store a segment count signal, and (iii) present the segment address signal responsive to the plurality of register states, the segment count signal, and the register address signal.

18 Claims, 5 Drawing Sheets

CONFIGURABLE HARDWARE REGISTER STACK FOR CPU ARCHITECTURES

FIELD OF THE INVENTION

The present invention relates to a processor generally and, more particularly, to a configurable hardware register stack used by the processor.

BACKGROUND OF THE INVENTION

Conventional hardware register stacks associated with a central processing unit (CPU) are implemented so that a predetermined subset of general registers, or all of the general registers within the hardware register stack, are stacked when doing a subroutine call. The subroutine calls are started and ended by jump and branch instructions. The general registers are pushed onto the hardware register stack before executing the subroutine. The general registers are popped off the hardware register stack before leaving the subroutine.

An instruction set architecture (ISA) of the CPU provides specific definitions for some general registers. For example, one general register is a link register. The link register saves an address of the jump or the branch instruction that caused the subroutine to be executed. Consequently, the ISA-specific general registers should not be used by executable code.

Code compilers use the ISA-nonspecific general registers for predetermined purposes. The code compilers, however, commonly use only a portion of the available general registers. As a result, pushing and popping from the hardware register stack is inefficient. The general registers unused by the ISA and by the code compilers are pushed and popped from the hardware register stack though they do not contain useful information. Furthermore, the unused general registers cannot be used to hold global information that is common to multiple subroutines because the values change each time a push or a pop instruction occurs.

Predeterminations in the ISA and the code compilers for stacking of the general registers result in less-than-optimal performances for stacking operations. Speed of time critical applications such as exceptions handling routines and interrupt handling routines is limited by the stacking operations. Furthermore, application of multiple ISAs by the CPU is often difficult or impossible because of the limitations imposed by the ISA-specific general registers.

SUMMARY OF THE INVENTION

The present invention concerns a circuit comprising a register stack and a control circuit. The register stack may be configured as (i) a plurality of segments addressable through a segment address signal and (ii) a plurality of registers within each of the plurality of segments. The plurality of registers are generally addressable through a register address signal. The control circuit may be configured to (i) store a plurality of register states, (ii) store a segment count signal, and (iii) present the segment address signal responsive to the plurality of register states, the segment count signal, and the register address signal.

The objects, features and advantages of the present invention include providing a method and/or a hardware register stack and controller that may (i) be programmed to fit different code compilers using different general registers when doing subroutine calls, (ii) execute fast subroutine calls, and/or (iii) speed up context switching when changing between different tasks while adding very little extra control overhead to the existing ways of implementing a register stack.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
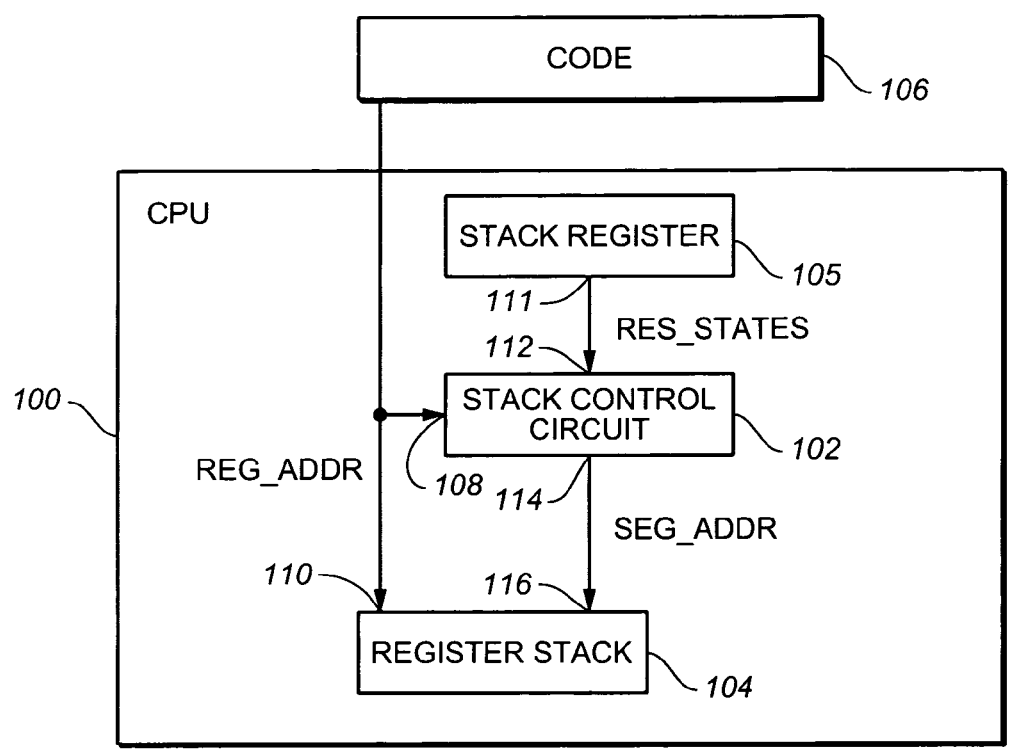
FIG. 1 is a block diagram illustrating a central processing unit (CPU) in accordance with a preferred embodiment of the present invention.

Referring to FIG. 1, a block diagram illustrating a central processing unit (CPU) 100 implementing a preferred embodiment of the present invention is shown. The CPU 100 generally comprises a stack control circuit 102, a register stack 104, and a stack register 105. The stack control circuit 102 and the register stack 104 may be in communications with software or code 106 being executed by the CPU 100.

The code 106 may present an address signal (e.g., REG_ADDR) to an input 108 of the stack control circuit 102 and an input 110 of the register stack 104. The stack register 105 may have an output 111 that may present a data signal (e.g., REG_STATES) to an input 112 of the stack control circuit 102. The signal REG_STATES may be set by the code 106 coming out of a reset handler operation for the CPU 100. The stack control circuit 102 may have an output 114 that may present an address signal (e.g., SEG_ADDR) to an input 116 of the register stack 104.

Figure 2:
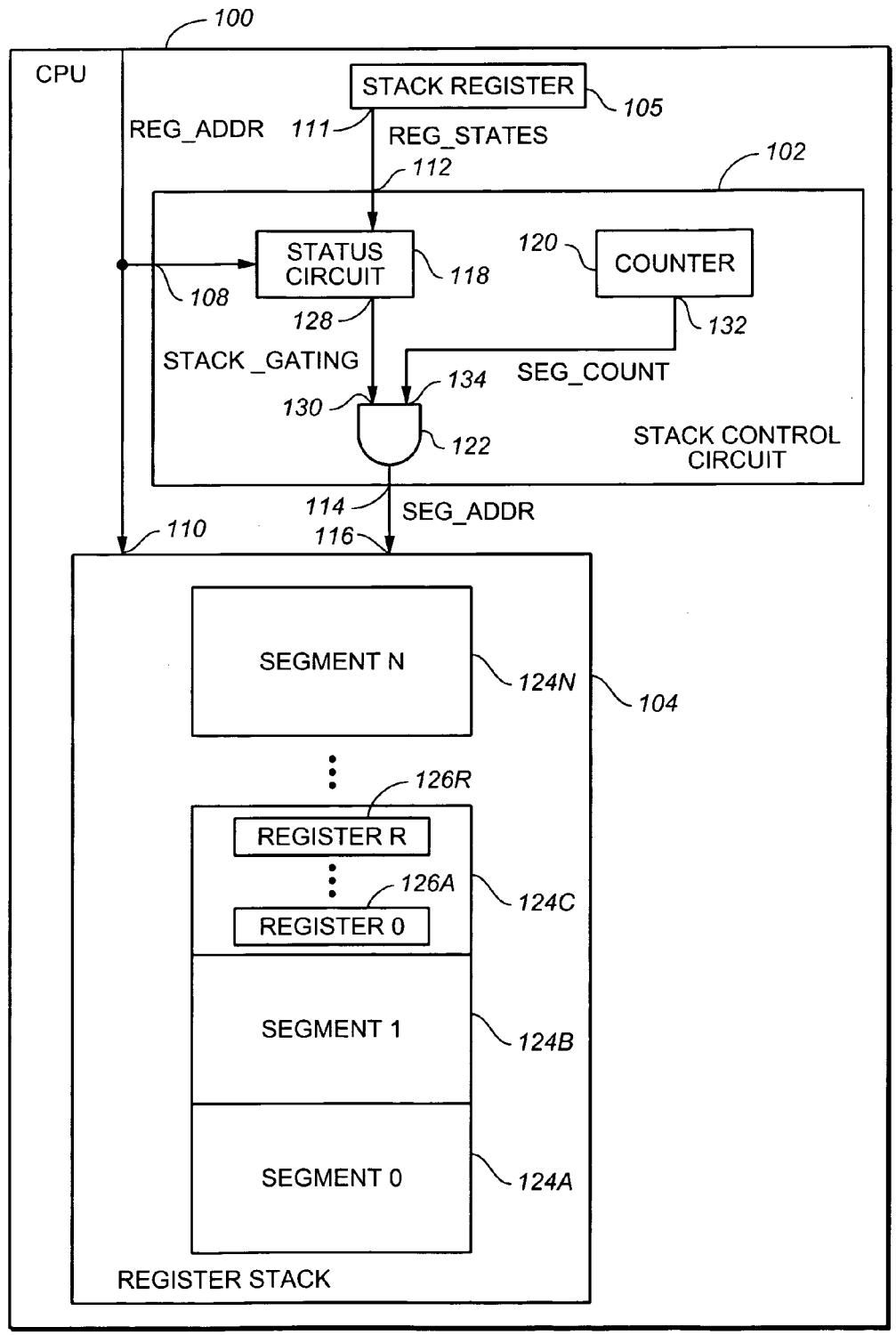
FIG. 2 is a more detailed block diagram illustrating an example of the CPU.

Referring to FIG. 2, a more detailed block diagram illustrating an example of the CPU 100 is shown. The stack control circuit 102 may comprise a status circuit 118, a counter 120, and a number of gates 122. The gates 122 may be implemented as logical AND gates. However, other types of gates may be implemented to meet the design criteria of a particular application. Generally, the hardware required to implement the stack control circuit 102 may be very small.

The register stack 104 may be implemented as a block of memory mapped registers. The register stack 104 may comprise multiple segments 124A-N. Each segment 124A-N may further comprise multiple registers 126A-R. The multiple registers 126A-R are illustrated only in a third segment 124C of the register stack 104 for clarity. The register stack 104 may be implemented using synchronous and/or asynchronous type random access memory (RAM) devices.

The signal REG_ADDR may be presented to the input 108 of the status circuit 118. The status circuit 118 generally has an output 128 that may present a gating signal (e.g., STACK_GATING) to inputs 130 of the gates 122. The signal REG_STATES is generally received at the input 112 of the status circuit 118. The counter 120 generally has an output 132 for presenting a count signal (e.g., SEG_COUNT) to inputs 134 of the gates 122. The signal SEG_ADDR may be presented at the output 114 by the gates 122.

The signal REG_STATES may have one symbol or one bit associated with each general register 126A-R of the CPU 100. Each symbol or bit of the signal REG_STATES may have one of two states, a global state or a stackable state. The global state generally indicates that the associated general register 126A-R is not to be pushed onto the register stack 104 upon entering a subroutine call, nor popped from the register stack 104 at the end of the subroutine call. The general registers 126A-R having the global state may be available to all subroutines and thus may provide a convenient mechanism to pass data among subroutines. In a preferred embodiment, at least one general register 126A-R may be fixed with the global state. For example, in the MIPS architecture (MIPS Technologies, Inc. of Mountain View, Calif.), a bottom register (R0) is wired to present a value of zero always. Since the bottom register (R0) cannot change values, the bottom register may be assigned the global state and made available to all subroutines without having to be repeated in all segments 124A-N of the register stack 104.

The stackable state generally indicates that the associated general register 126A-R should be pushed and popped to and from the register stack 104. Data stored in a stackable general register 126A-R is generally changeable only by the calling subroutine. In a preferred embodiment, at least one general register 126A-R may be fixed with the stackable state. For example, the MIPS architecture defines the top register (R31) as a link register. As part of a push instruction, a return address is generally stored in the link register. Using the present invention, the link register may be pushed by incrementing the signal SEG_ADDR prior to writing the return address into the link register. The return address may be popped by reading the return address from the link register prior to decrementing the signal SEG_ADDR. Consequently, the top register (R31) should always be stacked in the MIP architecture since the return address from the subroutine should be saved.

The status circuit 118 may also receive the signal REG_ADDR. The signal STACK_GATING may be presented by the status circuit 118 based upon the state of the symbol or bit stored in the status circuit 118 associated with the general register 126A-R identified by the signal REG_ADDR. A combination of the signal REG_ADDR and the signal SEG_ADDR is generally used to identify one register 126A-R within one segment 124A-N of the register stack 104 being accessed.

Figure 3:
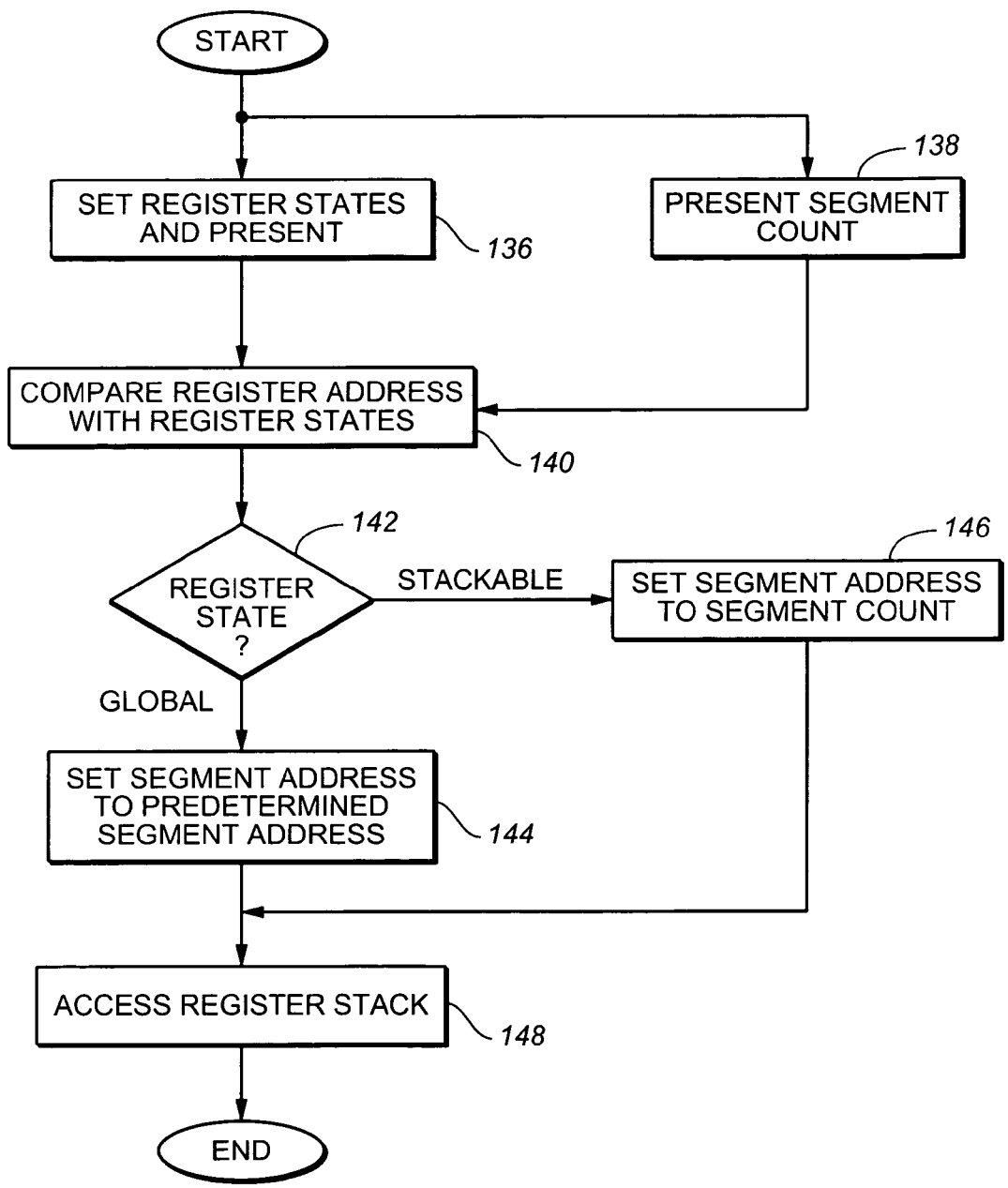
FIG. 3 is a flow diagram of a method for controlling a register stack.

Referring to FIG. 3, a flow diagram of a method for controlling the register stack 104 is shown. Operationally, the signal REG_STATES may be set or loaded into the stack register 105 and presented to the status circuit 118 (e.g., block 136). The counter 120 presents the signal SEG_COUNT to identify the current segment 124A-N at the top of the register stack 104 (e.g., block 138). The counter 120 is normally initialized to zero, indicating that the segment zero 124A is the initial top of the register stack 104. Upon execution of a push instruction, the counter 120 generally increments the signal SEG_COUNT. Incrementing the signal SEG_COUNT effectively moves the top of the register stack 104 up one segment 124A-N. If the signal SEG_COUNT is already at the top of the register stack 104 (e.g., segment 124N) when the push instruction is executed, then a normal exception routine may be invoked.

Upon execution of a pop instruction, the counter 120 generally decrements the signal SEG_COUNT. Decrementing the signal SEG_COUNT effectively moves the top of the register stack 104 down one segment 124A-N. If the signal SEG_COUNT is already at the bottom segment (e.g., segment zero 124A) when the pop instruction is executed, then a normal exception routine may be invoked.

The signal STACK_GATING may be compared with the signal SEG_COUNT to present the signal SEG_ADDR (e.g., block 140). In a preferred embodiment, if the signal STACK_GATING is in the global state (e.g., the GLOBAL branch of decision block 142), then the signal SEG_ADDR may be presented as a predetermined segment address (e.g., block 144). In particular, the signal STACK_GATING may use a logical low (e.g., a digital zero) as the global state and a logical high (e.g., a digital one) as the stackable state. Using the above convention, the signal STACK_GATING in the global state causes the signal SEG_ADDR to be presented as all logical zeros, thus addressing the segment zero 124A. Likewise, if the signal STACK_GATING in the stackable state (e.g., the STACKABLE branch of decision block 142), then the signal SEG_ADDR may be set to the signal SEG_COUNT (e.g., block 146). Once the signal SEG_ADDR has been determined, the appropriate general register 126A-N of the appropriate segment 124A-N of the register stack 104 may be accessed (e.g., block 148). A general delay time from receiving the signal REG_ADDR to having the proper register 126A-R accessible may be less than one clock cycle in a preferred embodiment. Other delay times may be implemented to meet the design criteria of a particular application.

Figure 4:
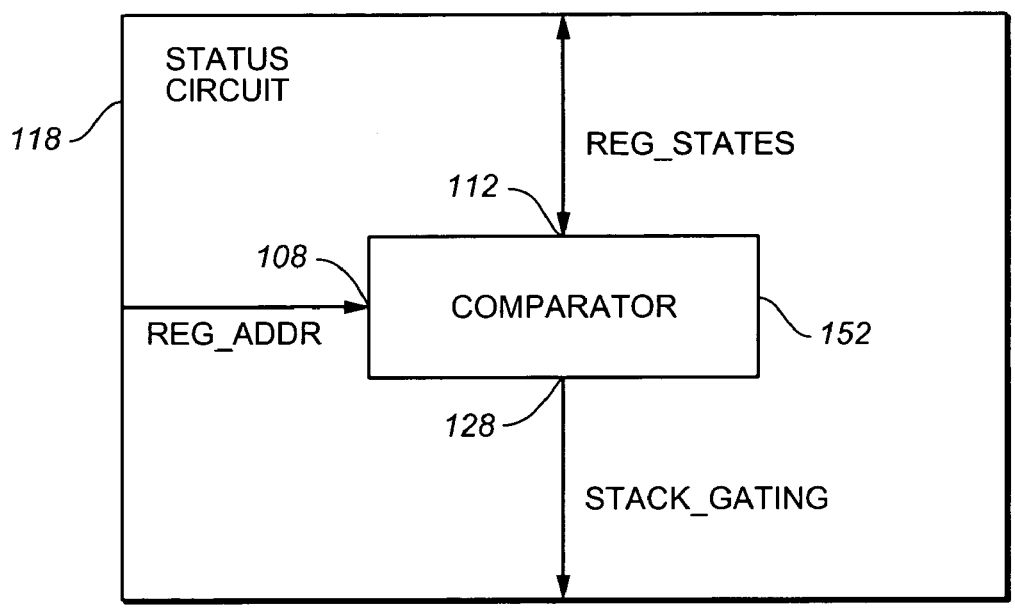
FIG. 4 is a detailed block diagram of a preferred embodiment of a status circuit within the CPU.

Referring to FIG. 4, a detailed block diagram illustrating a preferred embodiment of the status circuit 118 is shown. The status circuit 118 may be implemented as a comparator 152. The comparator 152 may have the input 108 that may receive the signal REG_ADDR and the input 112 that may receive the signal REG_STATES. The comparator 152 may also have the output 128 for presenting the signal STACK_GATING. The comparator is generally configured to select the state of one general register 126A-R from the signal REG_STATES, based upon the signal REG_ADDR. The 10, selected state may be presented as the signal STACK_GATING.

Figure 5:
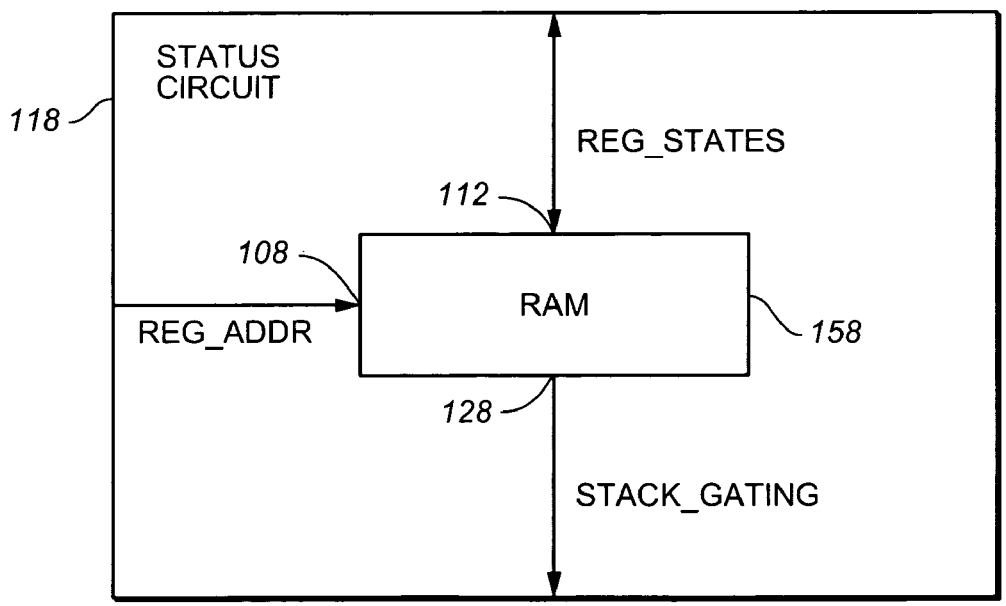
FIG. 5 is a detailed block diagram of an alternative embodiment of the status circuit.

Referring to FIG. 5, a detailed block diagram of an alternative embodiment of the status circuit 118 is shown. A random access memory (RAM) device 158 may be used to store the signal REG_STATES and present the signal STACK_GATING. The RAM 158 may comprise R-by-1 bit addressable memory cells. Each memory cell generally stores the global/stackable state for one general register 126A-R. The RAM 158 may have a one-bit output (e.g., the output 128) addressed using the signal REG_ADDR. The one-bit output generally presents the signal STACK_GATING.

Figure 6:
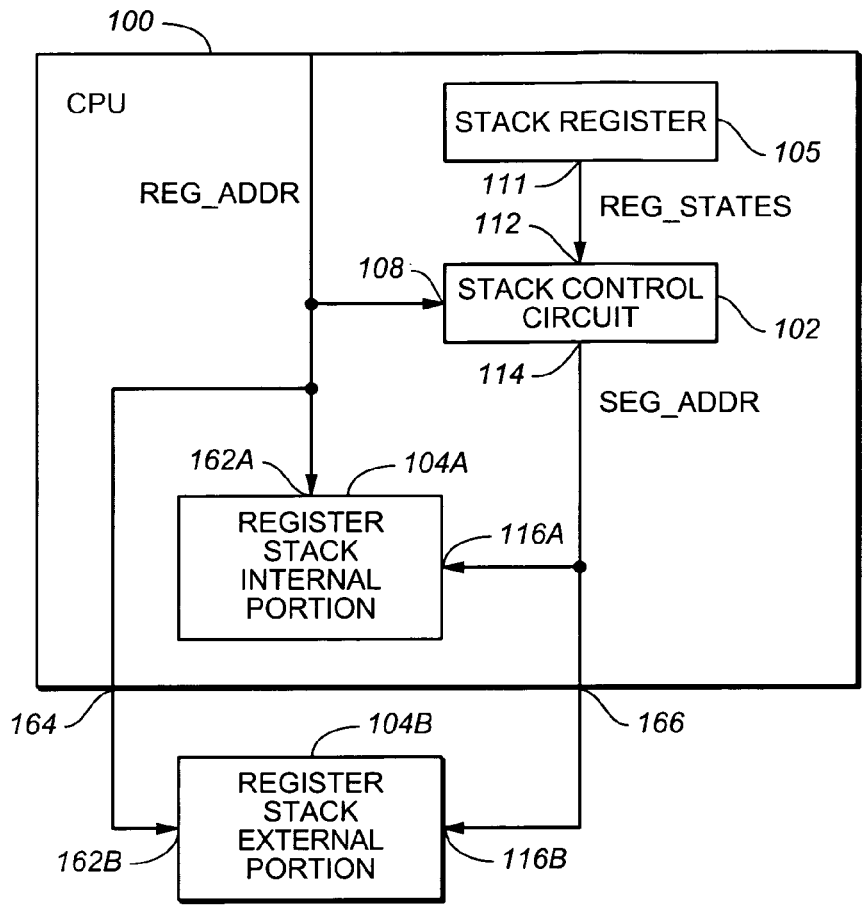
FIG. 6 is a block diagram of an alternative embodiment of the present invention.

Referring to FIG. 6, a block diagram of an alternative embodiment of the present invention is shown. In this alternative embodiment, the register stack 104 may be physically implemented in two portions, one portion remotely located from the other portion. A first portion 104A of the register stack 104 may be physically implemented inside the CPU 100 as before. A second portion 104B of the register stack 104 may be physically implemented external to the CPU 100. Consequently, the CPU 100 may have an output 164 and another output 166 to present the signal REG_ADDR and the signal SEG_ADDR respectively to the second portion 104B. The first portion 104A may have an input 162A to receive the signal REG_ADDR and an input 116A to receive the signal SEG_ADDR. Likewise, the second portion 104B may have an input 162B to receive the signal REG_ADDR and an input 116B to receive the signal SEG_ADDR.

Each of the first portion 104A and the second portion 104B are generally implemented as one or more segments 124. An advantage of implementing the second portion 104B external to the CPU 100 is that the second portion 104B may be customized to the design criterial of a particular application. Where the particular application requires a minimal register stack 104, then the external portion 104B may be implemented with only a few or even no segments 124. Were the particular application requires a large register stack 104, then the external portion 104B may be implemented with many segments 124 without impacting the design of the CPU 100. In one implementation, the internal portion 104A may be eliminated and the entire stack register 104 may be the external portion 104B.

Figure 7:
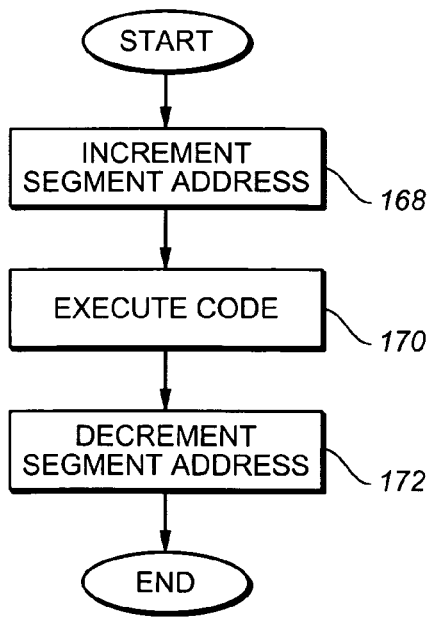
FIG. 7 is a flow diagram of a method for using the register stack.

Referring to FIG. 7, a flow diagram of a method for using the stack register 104 is shown. Upon execution of a push instruction for a subroutine call, the signal SEG_ADDR may be incremented (e.g., block 168). The CPU 100 may then execute the code 106 for the subroutine call (e.g., block 170). Upon completion of the subroutine call, the signal SEG_ADDR may be decremented (e.g., block 172).

The ability of the code 106 to change the global/stackable state of individual general registers 126A-R generally allows for customization of the register stack 104. For example, the register stack 104 may be configured to optimize specific subroutine calls intended to execute quickly, such as interrupt and exception handlers. By implementing the register stack 104 internal to the CPU 100, the general register 126A-R may be stacked in one clock cycle or less without requiring any stall cycles. In another example, the ability to program the global/stackable state of the general registers 126A-R generally allows for code 106 compiled by different compilers to be executed by the same CPU 100. Each time code 106 from a different compiler is to be executed, the global/stackable state of each general register 126A-R may be changed to match the compiler. This may be well suited for operating systems to speed up context switching when changing between different tasks.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation.

The function performed by the flow diagrams of the figures may be implemented as emulations, simulations and/or models using a conventional general purpose digital computer programmed according to the teachings of the present specification, as will be apparent to those skilled in the relevant art (s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can 1Q include, but is not limited to, any type of disk including floppy disk, optical disk, CD-ROM, and magneto-optical disks, ROMs, RAMs, EPROMs, EEPROMs, Flash memory, magnetic or optical cards, or any type of media.

While the invention has been particularly shown and described with reference to the preferred embodiments thereof, it will be understood by those skilled in the art that various changes in form and details may be made without departing from the spirit and scope of the invention.

The invention claimed is:

1. A circuit comprising:
    a register stack configured as (i) a plurality of segments addressable through a segment address signal and (ii) a plurality of registers within each of said plurality of segments, said plurality of registers being addressable through a register address signal;
    a control circuit connected to said register stack and configured to (i) store a plurality of register states, and (ii) store a segment count signal, wherein said control circuit comprises (A) a status circuit configured to present a gating signal responsive to both said register address signal and said register states and (B) a plurality of logic gates configured to present said segment address signal by logically ANDing said gating signal and said segment count signal; and
    a stack register connected to said control circuit and configured to present said register states to said control circuit, wherein each of said register states has one associated register of said registers.

2. The circuit according to claim 1, wherein at least one of said register states is fixed in a global state indicating that data cannot be pushed onto said one associated register.

3. The circuit according to claim 1, wherein at least one of said register states is fixed in a stackable state indicating that data can be pushed onto said one associated register.

4. The circuit according to claim 1, wherein said register stack further comprises:
    a first portion disposed within a processor and configured as at least one segment of said plurality of segments.

5. The circuit according to claim 4, wherein said register stack further comprises:
    a second portion disposed external to said processor and configured as at least one segment of said plurality of segments.

6. The circuit according to claim 1, wherein said status circuit comprises:
    a comparator configured to present said gating signal by comparing said register states and said register address signal.

7. The circuit according to claim 1, wherein said status circuit comprises:
    a memory device configured to (i) store said register states and (ii) present said gating signal by reading out one of said register states as addressed by said register address signal.

8. The circuit according to claim 1, wherein said plurality of logic gates are further configured to present said segment address signal as a predetermined address responsive to said gating signal having a global state.

9. The circuit according to claim 8, wherein said status circuit comprises:
   a comparator configured to present said gating signal by comparing said register states and said register address signal.

10. The circuit according to claim 1, wherein said control circuit comprises:
   a counter configured to present said segment count signal identifying a current segment of said segments at a logical top of said register stack.

11. A method of controlling a register stack comprising the steps of:
   (A) presenting a plurality of register states from a stack resister, wherein each of said register states has one associated register of a plurality of registers in said register stack;
   (B) storing said register states presented from said stack register;
   (C) storing a segment count;
   (D) presenting a gating signal responsive to both a register address and said register states;
   (E) logically ANDing said segment count with said gating signal to present a segment address;
   (F) addressing a plurality of segments within said register stack with said segment address; and
   (G) addressing said registers within one of said segments with said register address.

12. The method according to claim 11, wherein step (D) further comprises the sub-step of:
   selecting one of said plurality of register states as said gating signal based upon said register address.

13. The method according to claim 11, further comprising the step of:
   writing said plurality of register states into a register under software control in response to a reset handler operation for a processor executing said software.

14. The method according to claim 11, further comprising the step of:
   incrementing said segment address in response to a push instruction.

15. The method according to claim 11, further comprising the step of:
   decrementing said segment address in response to a pop instruction.

16. The method according to claim 11, further comprising the step of:
   presenting said segment address as a predetermined address responsive to said gating signal having a global state.

17. The method according to claim 11, further comprising the step of:
   transferring said register states from a first memory to a second memory.

18. A circuit comprising:
   register stack means configured as (i) a plurality of segments addressable through a segment address and (ii) a plurality of registers within each of said plurality of segments, said plurality of registers being addressable through a register address;
   means for storing a plurality of register states;
   means for storing a segment count;
   means for presenting a gating signal responsive to both said resister address and said register states;
   means for presenting said segment address by logically ANDing said gating signal and said segment count; and
   means for presenting said register states to said means for storing said register states, wherein each of said register states has one associated register of said registers.

* * * * *